United States Patent
Desotelle et al.

(10) Patent No.: US 11,186,302 B2
(45) Date of Patent: Nov. 30, 2021

(54) SECTION BASED SAFETY FUNCTIONS FOR INDEPENDENT CART APPLICATIONS

(71) Applicant: Rockwell Automation Technologies, Inc., Mayfield Heights, OH (US)

(72) Inventors: Sawyer J. Desotelle, Eden Prairie, MN (US); Patrick E. Ozimek, Mequon, WI (US); Mark R. Cooper, Eden Prairie, MN (US); David D. Van Dorpe, Eden Prairie, MN (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 357 days.

(21) Appl. No.: 16/188,696

(22) Filed: Nov. 13, 2018

(65) Prior Publication Data
US 2020/0148240 A1   May 14, 2020

(51) Int. Cl.
*B61L 23/16* (2006.01)
*B61B 13/08* (2006.01)
(Continued)

(52) U.S. Cl.
CPC ............. *B61L 23/16* (2013.01); *B61B 13/08* (2013.01); *B61L 23/20* (2013.01); *B61L 23/34* (2013.01)

(58) Field of Classification Search
CPC .......... B61B 13/08; B61L 23/16; B61L 23/20; B61L 23/34; B61L 313/08; G05B 19/406;
(Continued)

(56) References Cited

U.S. PATENT DOCUMENTS

| 4,613,805 A | * | 9/1986 | Matsuo | B65G 54/02 318/687 |
| 9,958,852 B2 | | 5/2018 | Bhatt et al. | |

(Continued)

FOREIGN PATENT DOCUMENTS

EP   3098673 A1   11/2016

OTHER PUBLICATIONS

Allen-Bradley; User Manual: "iTRAK System Bulletin 2198T"; dated Jun. 30, 2017; URL:https://literature.rockwellautomation.com/idc/groups/literature/documents/um/2198t-um001_-eng-p.pdf; pp. 121-125.

(Continued)

*Primary Examiner* — Mark T Le
(74) *Attorney, Agent, or Firm* — Boyle Fredrickson, SC

(57) ABSTRACT

An independent cart system with safety functions prevents unintended motion independently within different sections of the track while permitting motion along other sections of the track. A safety controller receives one or more input signals corresponding to operating conditions along the track. A safety program executing in the safety controller monitors the state of the input signals to determine whether a safety function is to be executed. When a safety program is executed, the safety controller transmits an output signal to one or more segment controllers present in one section along the track. Each segment controller is responsible for regulating current flow to the coils mounted to the corresponding track segment. In response to the signal from the safety controller, each segment controller in the section controls the power output to the coils along that section of track to achieve the safe operation desired in that segment.

20 Claims, 7 Drawing Sheets

(51) Int. Cl.
*B61L 23/20* (2006.01)
*B61L 23/34* (2006.01)

(58) Field of Classification Search
CPC ...... G05B 19/4189; G05B 2219/40217; G05B 2219/41327; G05B 2219/41337; B60L 13/03; B60L 15/005; B60L 13/10; B60L 13/006; B60L 13/04; B60L 13/00; B60L 13/06
See application file for complete search history.

(56) References Cited

U.S. PATENT DOCUMENTS

| | | |
|---|---|---|
| 10,035,660 B2 | 7/2018 | Zoeller et al. |
| 2013/0035784 A1* | 2/2013 | Wernersbach ........ B60L 15/005 700/230 |
| 2016/0355350 A1* | 12/2016 | Yamamoto ......... G05B 19/4189 |
| 2018/0074477 A1 | 3/2018 | Burkhard et al. |
| 2018/0090254 A1 | 3/2018 | Ozimek et al. |
| 2019/0344967 A1* | 11/2019 | Tomoda ................ B60L 13/035 |

OTHER PUBLICATIONS

Extended European Search Report dated Apr. 29, 2020; Application No. 19208818.5—(9) pages.
European Communication pursuant to Article 94(3) EPC dated Oct. 22, 2021; Application No. 19 208 818.5—(7) pages.

* cited by examiner

SECTION BASED SAFETY FUNCTIONS FOR INDEPENDENT CART APPLICATIONS

BACKGROUND INFORMATION

The present invention relates to implementing safety functions on an independent cart system and, more specifically, to partitioning a track in an independent cart system to implement safety functions in different sections of the track.

Motion control systems utilizing independent cart technology employ a linear drive system, embedded within a track and multiple movers, or carts, that are propelled along the track via the linear drive system. Movers and linear motors can he used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" or carts each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the electromagnetic fields generated by the coils. In certain applications, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. In a closed path application, the mover completes the cycle along a return path and returns to the loading station to receive another unit of the product.

As the application of independent cart technology increases, the layout of tracks has gained increased flexibility. Rather than forming a closed path, tracks may include multiple branches or spurs, where a cart may travel along different paths or may be required to return along the same section of track rather than completing a closed loop. Selection of a path may depend on the size of the mover, the type of product or whether a product is being carried by the mover, a particular operation to be performed on the product or mover, or the like. The additional flexibility of the track layout has spurred implementation of independent cart technology in new applications.

As a result of the increased flexibility and of the increasing number of applications in which independent cart systems are being utilized, independent cart systems are realizing an increase in the required interaction with humans. For example, the independent cart system may require a technician to interact with a product as it travels along the track. A warehouse employee may load or unload product onto the movers. Maintenance personnel may service one or more movers while the rest of the system remains operational. Whenever there is interaction with a human, it is desirable to ensure that there is no unintended motion of the mover with which the human is interacting.

Historically, it has been known to provide protection of humans interacting with machinery by removing power from the machinery. With no power supplied to the machinery, there is no potential for commanded motion of the machinery to occur. In certain applications, however, there may still be the potential for motion due for example to gravity acting on a suspended load or residual motion of a rotating member of the machinery. In such applications, it is desirable to bring the machinery to a safe stop and secure the machine, for example, via a mechanical brake or stop prior to removing power from the machinery.

An independent cart system, however, provides unique challenges to ensuring the safety of humans interacting with the system. Because it is desirable to provide motion along a portion of the system while interaction occurs on another portion of the system, power cannot be removed from the system and allow parts of the system to maintain operation. Additionally, providing a mechanical brake or stop on movers within a section does not eliminate the potential for additional movers from entering the section in which human interaction is occurring.

Thus, it would be desirable to provide an independent cart system with safety functions that prevent unintended motion independently within different sections of the track while permitting motion along other sections of the track.

BRIEF DESCRIPTION

The subject matter disclosed herein describes an independent cart system with safety functions that prevent unintended motion independently within different sections of the track while permitting motion along other sections of the track. A safety controller receives one or more input signals corresponding to operating conditions along the track. A safety program executing in the safety controller monitors the state of the input signals to determine whether a safety function is to be executed. When the state of the input signal indicates a safety function is required, the safety controller executes the safety program and transmits an output signal to one or more segment controllers present in one of the sections along the track indicating safe operation is desired in the corresponding segment. Each segment controller is responsible for regulating current flow to the coils mounted to the corresponding track segment. In response to the signal from the safety controller, each segment controller in the section controls the power output to the coils along that section of track to achieve the safe operation that is desired in that segment. The safe operation may include preventing or restricting motion of a mover within that section of track.

According to a first embodiment of the invention, an independent cart system includes a track having multiple track segments and multiple movers. Each track segment includes multiple coils spaced along the track segment and a segment controller operative to regulate a current flow in the coils. Each mover includes a set of drive magnets, and each mover is configured to travel along the track responsive to an interaction between the set of drive magnets on the mover and an electromagnetic field generated by the current flow in the coils. The independent cart system also includes a safety controller in communication with the segment controller in at least one of the track segments, where the safety controller includes at least one input configured to receive a safety signal. The safety controller is operative to receive the safety signal at the at least one input, execute a safety function responsive to receiving the safety signal, and transmit an output signal to the segment controller with which the safety controller is in communication responsive to executing the safety function. The segment controller is operative to disable the current flow in the coils responsive to receiving the output signal from the safety controller.

According to another embodiment of the invention, a method is disclosed for implementing a safety function in an independent cart system. The independent cart system includes a track having a plurality of track segments and a plurality of movers configured to travel along the track. A current is regulated in multiple coils present along each track segment, selected from the plurality of track segments, with a segment controller corresponding to each track segment. The current is regulated to control operation of each of the movers present on the corresponding track segment. An input signal is received at a safety controller, where the input signal indicates safe operation is desired in at least one section of the track. The track includes multiple sections defined along the track, and at least one track segment is present in each of the sections. A safety function is executed in the safety controller responsive to receiving the input signal, and an output signal is transmitted from the safety controller to each segment controller corresponding to each track segment within the at least one section of the track in which safe operation is desired. Current is disabled in each of the coils present along each track segment within the at least one section of the track in which safe operation is desired responsive to receiving the output signal at the corresponding segment controller.

According to still another embodiment of the invention, an independent cart system having a track with multiple segments and multiple movers configured to travel along the track is disclosed. The independent cart system includes multiple segment controllers and a safety controller in communication with each of the segment controllers. Each segment controller corresponds to one of the segments and is operative to regulate a current output to multiple coils spaced along the segment responsive to a motion command for at least one of the movers located on the segment. The safety controller includes at least one input configured to receive a safety signal. The safety controller is operative to receive the safety signal at the at least one input, execute a safety function responsive to receiving the safety signal, and to transmit an output signal to at least one of the segment controllers with which the safety controller is in communication responsive to executing the safety function. The segment controller is operative to disable the current output to the plurality of coils responsive to receiving the output signal from the safety controller.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
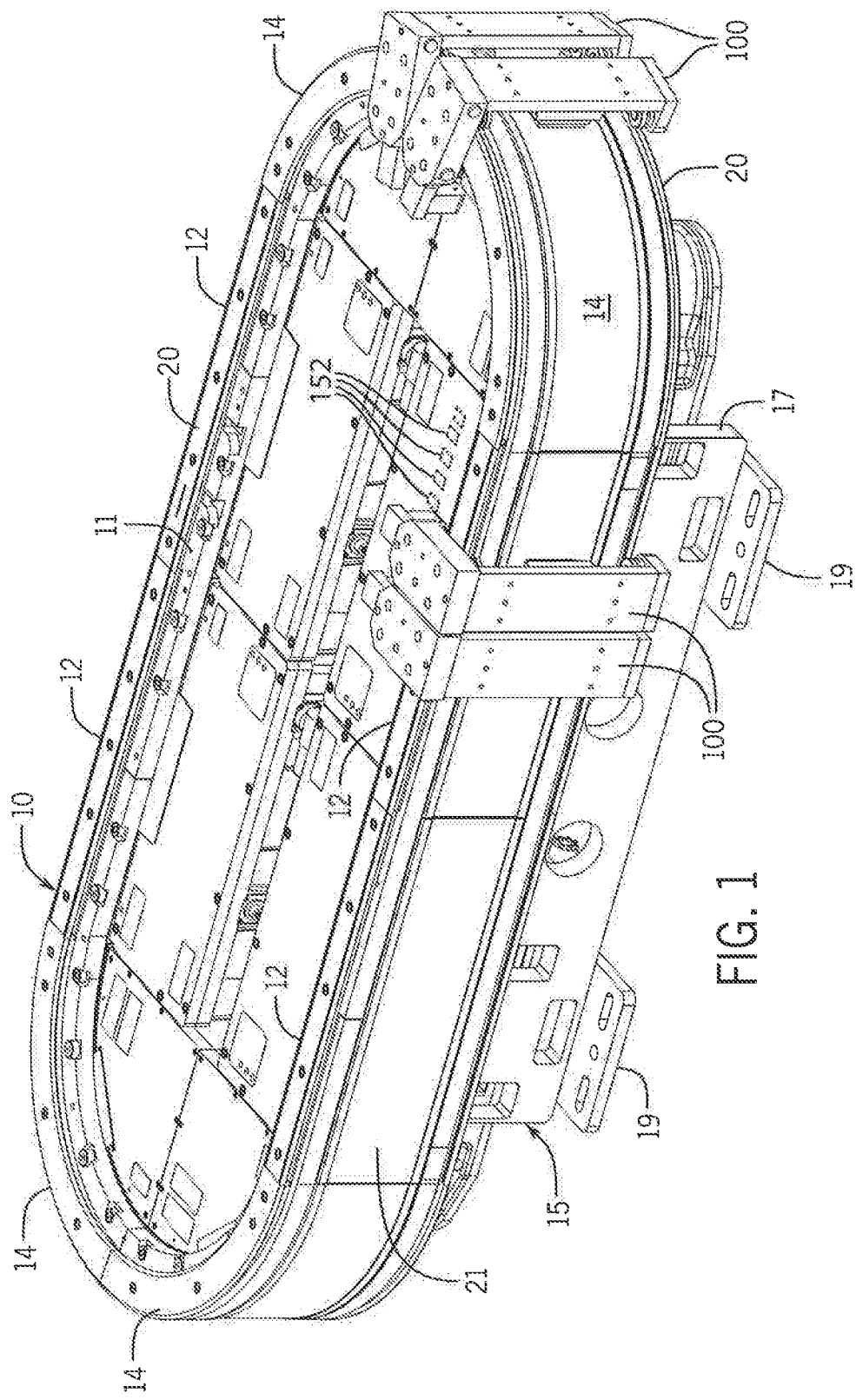
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art,

DETAILED DESCRIPTION

The various features and advantageous details of the subject matter disclosed herein are explained more fully with reference to the non-limiting embodiments described in detail in the following description.

Turning initially to FIG. 1, an exemplary independent cart transport system for moving articles or products includes a track 10 made up of multiple segments 12, 14. According to the illustrated embodiment, the segments define a generally closed loop supporting a set of movers 100, also referred to herein as carts, movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments 12, 14 of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track 10 and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Figure 3:
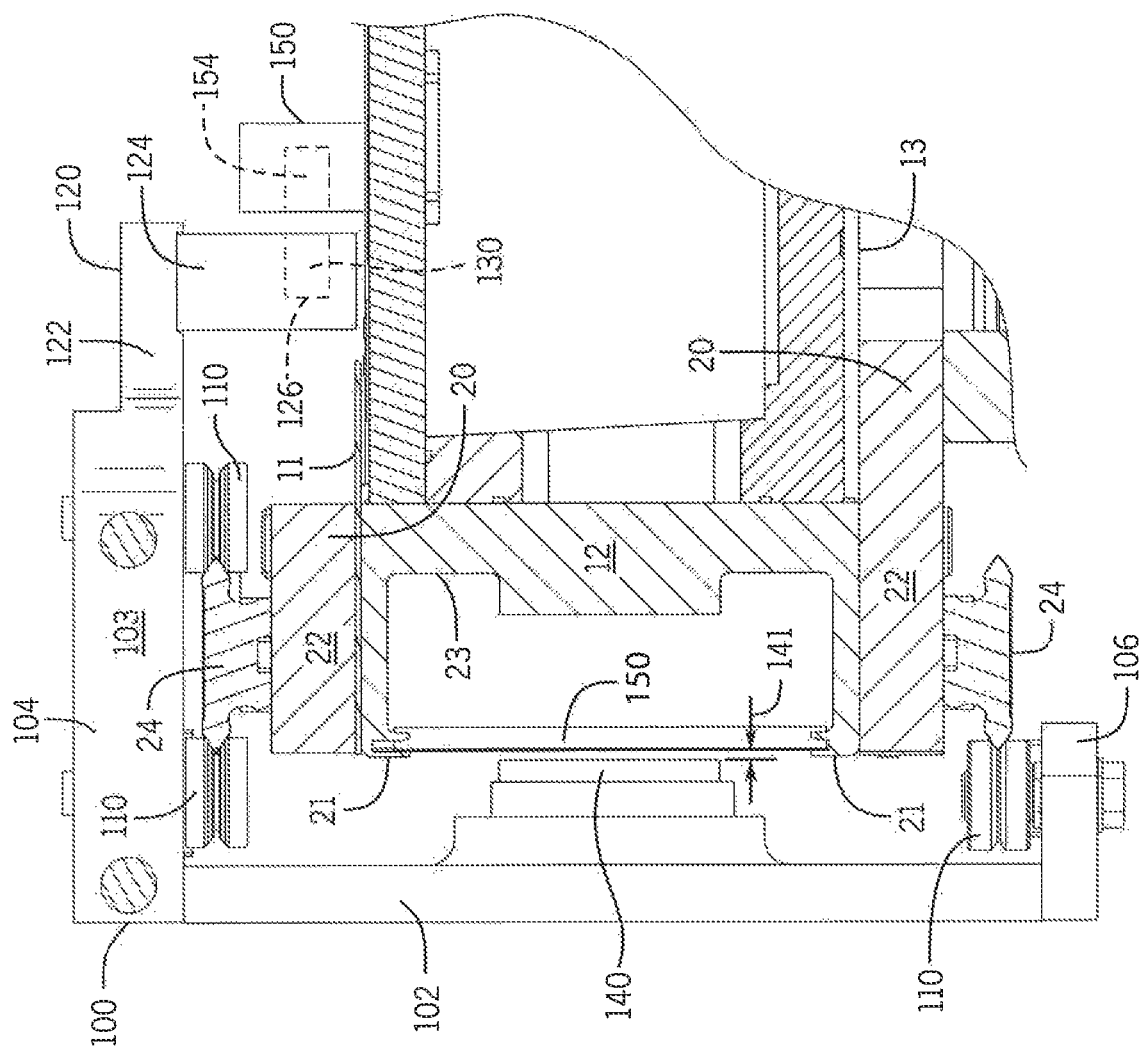
FIG. 3 is a partial sectional view of the transport system of FIG. 1.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment 12, 14 and a second rail 20 extends along a lower surface 13 of each segment. With reference also to FIG. 3, the illustrated embodiment of each rail 20 includes a base 22 and a track portion 24. The base 22 is secured to the upper surface 11 or lower surface 13 of each segment 12, 14 and the track portion 24 is mounted to the base 22. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. Each mover 100 includes complementary rollers 110 to engage the track portion 24 of the rail 20 for movement along the track 10.

Figure 4:
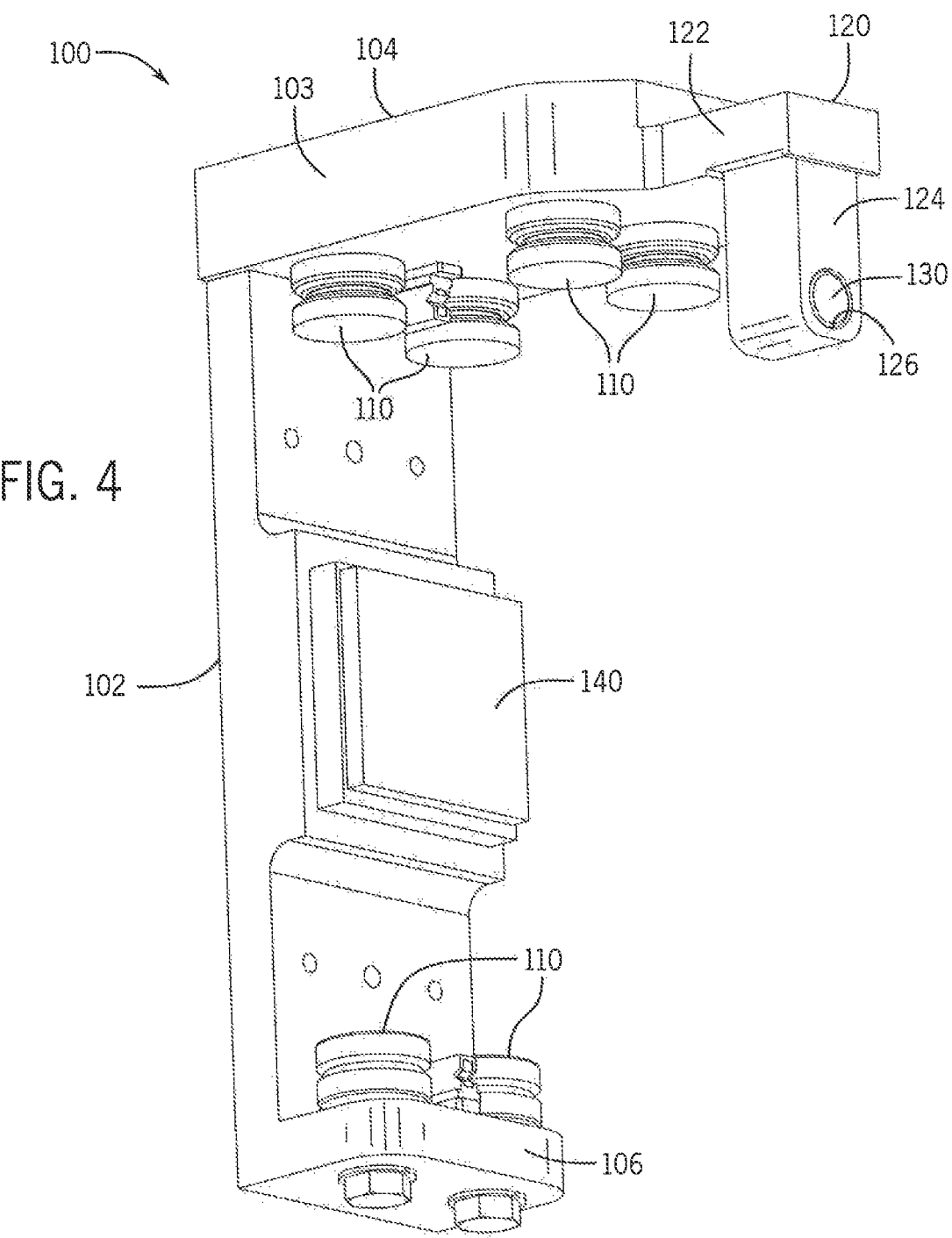
FIG. 4 is an isometric view of a mover from the transport system of FIG. 1.

One or more movers 100 are mounted to and movable along the rails 20 on the track 10. With reference next to FIG. 4, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when the mover 100 is mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment 12, 14 but of sufficient distance to have the position magnet 130 mounted thereto. According to the illustrated embodiment, a position magnet 130 is mounted within a recess 126 on the second portion 124 and is configured to align with a sensor 152 mounted to the top surface 11 of the track segment.

Figure 7:
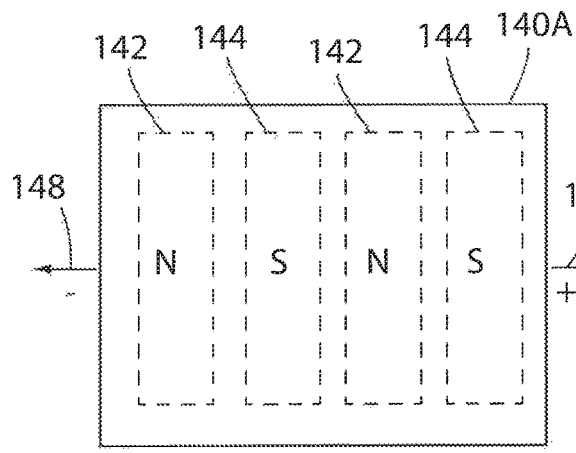
FIG. 7 is a partial front elevation view of the mover of FIG. 4 illustrating a set of drive magnets mounted in a first configuration on the mover.
Figure 8:
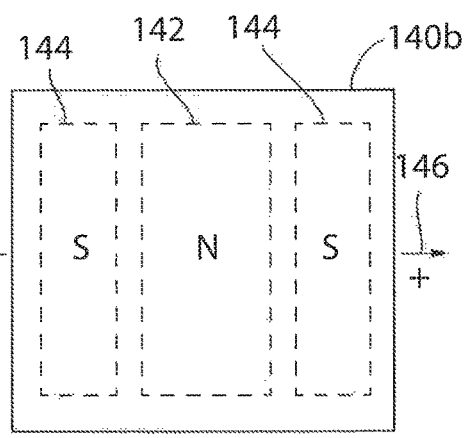
FIG. 8 is a partial front elevation view of the mover of FIG. 4 illustrating a set of drive magnets mounted in a second configuration on the mover.

A linear drive system is incorporated in part on each mover 100 and in part within each track segment 12, 14 to control motion of each mover 100 along the segment. On each mover 100, the linear drive system includes multiple drive magnets mounted to the side member 102. The movers 100 act as individual rotors when compared to a rotary machine and the drive magnets are analogous to the permanent magnets embedded in (e.g., interior permanent magnet (PM) machine) or on the surface of (e.g., surface PM machine) a rotary PM machine. According to the illustrated embodiment, the drive magnets 140 are arranged in a block along an inner surface of the side member 102 with separate magnet segments 142, 144 alternately having a north pole 142, N, and south pole 144, S, pole facing the track segment 12, 14 (see also FIGS. 7-8). The drive magnets 140 are typically permanent magnets, and two adjacent magnet segments including a north pole 142 and a south pole 144 may be considered a pole-pair. Optionally, as shown in FIG. 8, a single magnet, located between two adjacent magnets, may have twice the area and an opposite polarity of the adjacent magnets and serves as part of the pole-pair for each adjacent magnet. Various other configurations of the drive magnets 120 may be utilized without deviating from the scope of the invention. The drive magnets 140 are mounted on the inner surface of the side member 102 and when mounted to the track 10 are spaced apart from a series of coils 150 extending along the track 10. As shown in FIG. 3, an air gap 141 is provided between each set of drive magnets 140 and the coils 150 along the track 10.

Figure 2:
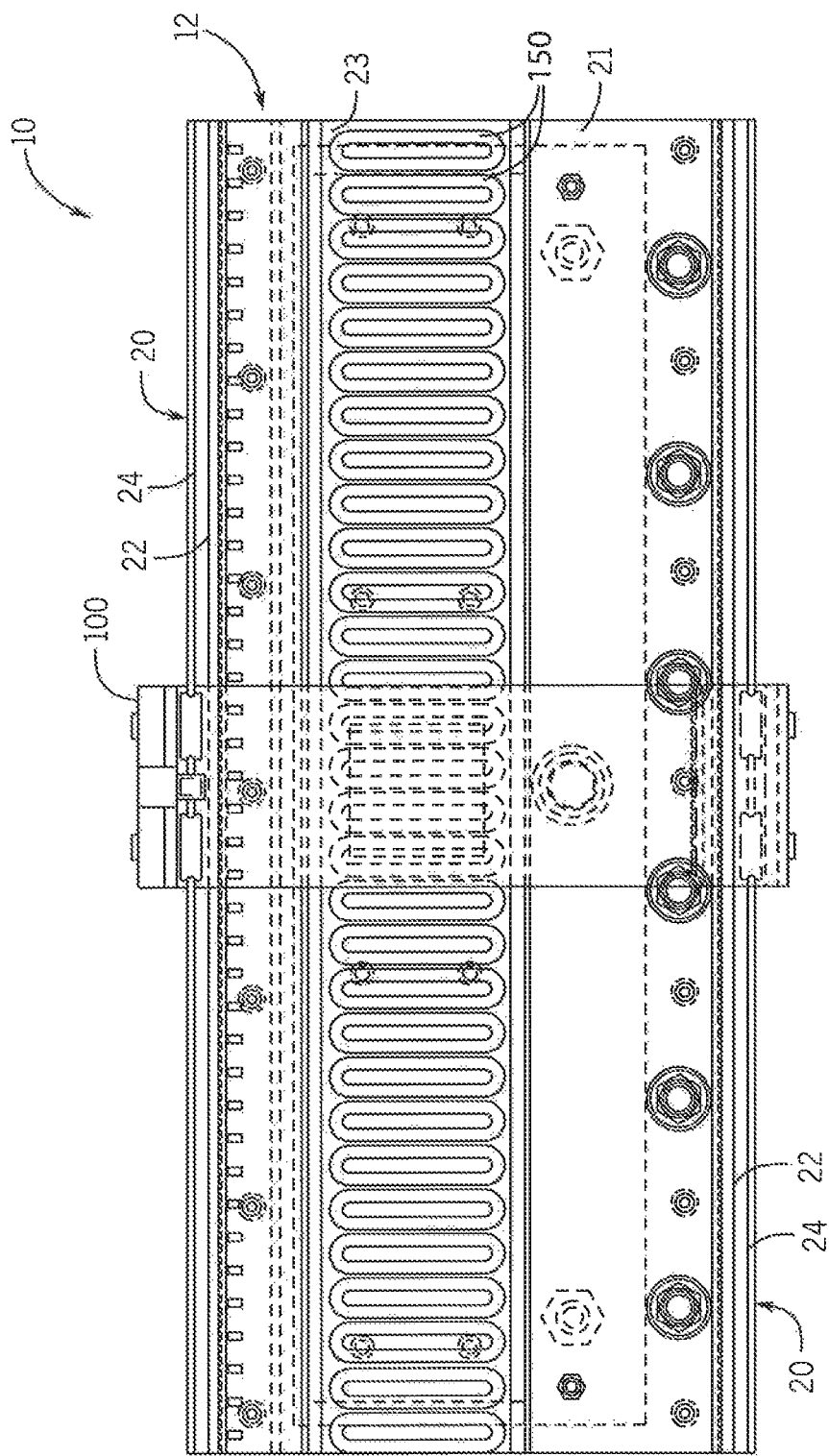
FIG. 2 is a partial side elevation view of one segment of the transport system of FIG. 1 illustrating activation coils distributed along one surface of the track segment.

On the track 10, the linear drive system includes a series of parallel coils 150 spaced along each track segment 12, 14 as shown in FIG. 2. According to the illustrated embodiment, each coil 150 is placed in a channel 23 extending longitudinally along one surface of the track segment 12, 14. The coils 150 act as a stator when compared to a rotary PM machine. The coils 150 are continuous along the length of the track 10 and are consistent with a single stator. Thus, control of the linear drive system, is analogous to controlling a single stator with multiple rotors that may be located at varying positions along the length of the stator. The electromagnetic field generated by each coil 150 spans the air gap and interacts with the drive magnets 140 mounted to the mover 100 to control operation of the mover 100. The coils 150 are energized sequentially according to the configuration of the drive magnets 140 present on the movers 100. The sequential energization of the coils 150 generates electromagnetic fields at each coil and that appears to a mover as a "traveling" electromagnetic field that interacts with the magnetic field of the drive magnets 140 to propel each mover 100 along the track segment 12, 14.

Figure 5:
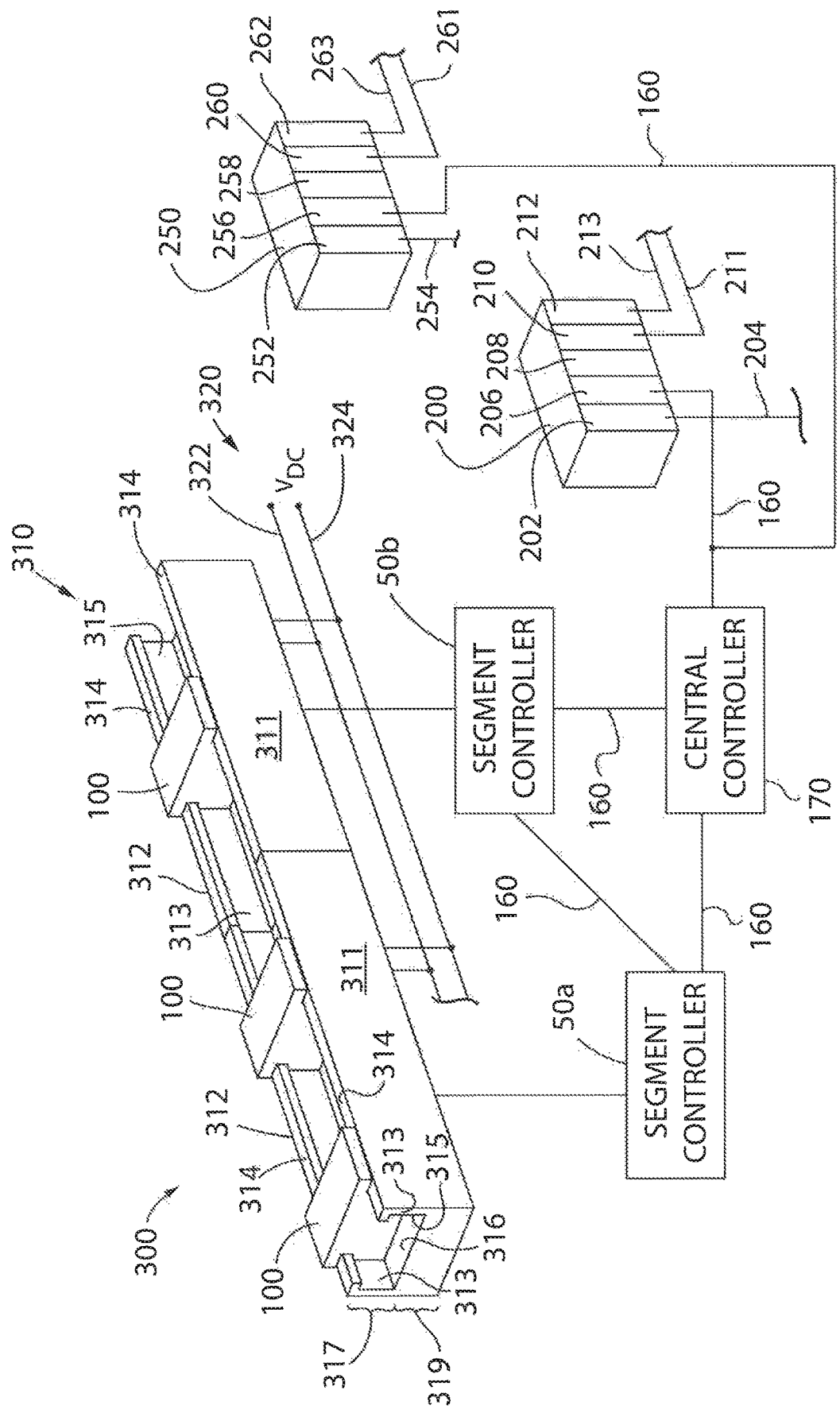
FIG. 5 is a schematic representation of an exemplary control system for a linear drive system according to one embodiment of the invention.

Turning next to FIG. 5, a portion of another exemplary independent cart transport system 300 for moving articles or products is illustrated. The illustrated system includes a track 310 made up of multiple segments 312. Rather than traveling along the sides of the track, as shown in FIG. 1, the illustrated movers 100 travel along a channel in the track 310. The channel is defined by a bottom surface 316 and a pair of opposing side walls 313. Rails 314 are placed along the length of the upper surface of each side wall 313 and are configured to support and engage the mover 100 as it travels along the track 310. Power is delivered to segments 312 via a DC bus 320 extending along the track 310. The DC bus 320 includes a positive rail 322 and a negative rail 324 where any suitable voltage potential is provided between the positive and negative rails to energize the coils 150.

The portion of the system illustrated in FIG. 5 includes two straight segments 312 and further illustrates an exemplary control system connected to the independent cart transport system. A segment controller 50 is provided within each track segment 312 to regulate current flow to the coils 150 forming the portion of the linear drive system in each track segment 312. Optionally, each segment controller 50 may also be responsible for all, or a portion of, the motion control of each mover 100 as it travels along the corresponding segment 312. According to one embodiment of the invention, the segment controllers 50 may be mounted together in a control cabinet. A cable, multiple cables, separate conductors, or a combination thereof extend from the control cabinet to each segment 12, 14 to deliver current to the coils 150 and to receive feedback signals, for example, from position sensors 152. In smaller systems, each segment controller 50, industrial controller 200, and safety controller 250 may be included in a single control cabinet. Depending on the size and layout of the track 10, additional control cabinets may be distributed around the track and a portion of the segment controllers 50 located in a control cabinet proximate the track segment 12, 14 they control. Separate control cabinets and controllers within a cabinet are communicatively connected via the network medium 160. Although illustrated as blocks in FIG. 5 external to the track segments 312, the illustration is to facilitate illustration of interconnects between controllers. According to still another embodiment, it is contemplated that each segment controller 50 may be mounted in the lower portion 319 of the track segment 312. Each segment controller 50 is in communication with an adjacent segment controller 50 and a central controller 170 which is, in turn, in communication with an industrial controller 200 and/or a safety controller 250. According to yet another embodiment, the central controller 170 may be removed and the functions of the central controller 170 incorporated into the segment controllers 50, the industrial controller 200, or a combination thereof, and each segment controller 50 may communicate directly with the industrial controller 200.

The industrial controller 200 may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the other controllers 50, 170, 250; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 or to the respective segment controllers 50 where the receiving controller operates to generate commands for the current required in each coil 150 of the corresponding segment controller 50 to control motion of each mover 100. Optionally, the industrial controller 200 may include a module in one of the slots of the chassis or embedded as a routine executing within the processor module 208 to perform a portion of the command generation and the processor module 208 may transmit a current command to a segment controller rather than a desired location.

Figure 6:
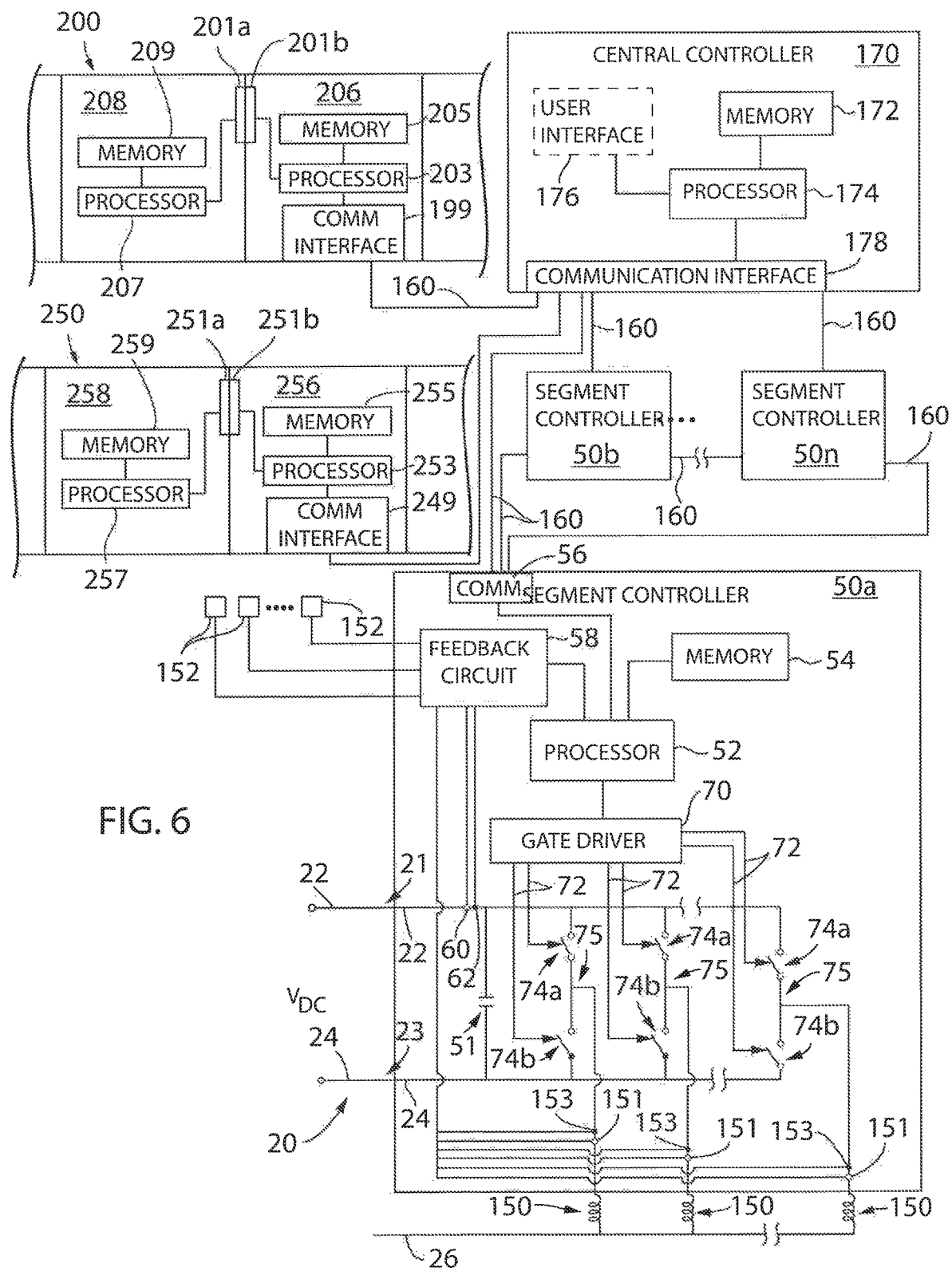
FIG. 6 is a block diagram representation of the exemplary control system of FIG. 5.

With reference also to FIG. 6, each module in the industrial controller 200 may include its own memory and processor and be configured to execute one or more routines corresponding to the desired operation of the respective module. The portion of the industrial controller illustrated in FIG. 6, shows a first processor 207 and a first memory device 209 located in the processor module 208 and a second processor 203 and a second memory 205 located in the communication module 206. A backplane connects each module within the industrial controller 200 and backplane connectors 201a, 201b are shown connecting the two modules. Although illustrated as directly connecting the two modules, the backplane is a communication bus extending along the chassis of the industrial controller and each backplane connector 201 for a module engages a complementary backplane connector on the communication bus aligned with the slot on the chassis in which the module is inserted. A communication interface 199 within the communication module 206 is configured to connect to the industrial network 160.

As further illustrated in FIG. 5, a safety controller 250 is also provided. The safety controller 250 is configured to monitor operation of the track 310 and movers 100 as well as any controlled machine or process interacting with the track and movers. According to the illustrated embodiment, the safety controller 250 is a second PLC. Similar to the industrial controller 200 provided to control the process line and track, the safety controller 250 includes: a power supply 252 with a power cable 254 connected, for example, to a utility power supply; a communication module 256 connected by a network medium 160 to the industrial controller 200, the central controller 170, the segment controllers 50, or any combination thereof; a processor module 258; an input module 260 receiving input signals 261 from sensors or other devices along the process line; and an output module 262 transmitting control signals 263, for example, to the industrial controller 200, the central controller 170, the segment controllers 50, or any combination thereof. It is contemplated that the safety controller 250 may be an entirely redundant controller to the industrial controller 200 receiving each input signal and generating each output signal.

With reference also to FIG. 6, each module in the safety controller 250 may include its own memory and processor and he configured to execute one or more routines corresponding to the desired operation of the respective module. The portion of the safety controller illustrated in FIG. 6, shows a first processor 257 and a first memory device 259 located in the processor module 258 and a second processor 253 and a second memory 255 located in the communication module 256. A backplane connects each module within the safety controller 250 and backplane connectors 251a, 251b are shown connecting the two modules. Although illustrated as directly connecting the two modules, the backplane is a communication bus extending along the chassis of the industrial controller and each backplane connector 251 for a module engages a complementary backplane connector on the communication bus aligned with the slot on the chassis in which the module is inserted. A communication interface 249 within the communication module 256 is configured to connect to the industrial network 160.

The safety controller 250 is operative to execute a safety program which, in part, implements safety functions to ensure safe operation of the track 310, movers 100, process line, or a combination thereof. According to other embodiments of the invention, the safety controller 250 may be a smaller controller having, for example a fixed, rather than modular, configuration. According to such an embodiment, the safety controller 250 would still receive selected input signals corresponding to interactions with the track 310, movers 100, or controlled process which require safe operation. The safety controller 250 executes one or more safety programs in response to the input signals and outputs a signal, either via a discrete output signal or via data in a message packet on the industrial network 160. The output signal is transmitted to the industrial controller 200, the central controller 170, the segment controllers 50, or any combination thereof as required to ensure safe operation. Operation of the safety functions will be discussed in more detail below.

With reference also to FIG. 6, the central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 50 on each track segment via a network medium 160. The central controller 170 may transfer a command signal to the segment controller 50 in each track segment to control energization of the coils 150. The central controller 170 may receive feedback signals corresponding to the identification and/or location of movers 100 along each track segment and control motion of the movers 100 directly from the central controller 170. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

In another aspect, known as "distributed" control, the central controller 170 may he configured to transfer the desired motion commands, or a portion thereof, from the central controller 170 to each of the segment controllers 50. The motion commands identify one or more desired movers 100 to be positioned at or moved along each track segment 312. The central controller 170 may distribute motion commands to each segment controller 50 according to the mover located at or proximate to the track segment 312. The corresponding segment controller 50 for each track segment 312 may, in turn, determine the appropriate command signals for each mover 100 and transmit the command signals to one or more power segments in each track segment to control energization of the coils 150. Distributed control can minimize the amount of communication in the system by allowing segment controllers 50, rather than the central controller 170, to control driving each mover 100 along the track 310. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

A position feedback system provides knowledge of the location of each mover 100 along the length of the track segment 12, 14 to the segment controller 50. In one embodiment, the position feedback system can include one or more position magnets 130 mounted to the mover 100 and an array of sensors 152 spaced along the track segment 12, 14. With reference again to FIG. 1, for convenience, only a few position sensors 152 are illustrated along one track segment 12. It is contemplated that the position sensors 152 would continue along each track segment 12, 14 and for the entire length of the track 10. The sensors 152 are positioned such that each of the position magnets 130 are proximate to the sensor as the mover 100 passes each sensor 152. The sensors 152 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 152 outputs a feedback signal provided to the segment controller 50 for the corresponding track segment 12 on which the sensor 152 is mounted. The feedback signal may be an analog signal provided to a feedback circuit 58 which, in turn, provides a signal to the processor 52 which corresponds to the magnet 130 passing the sensor 152.

The segment controller 50 also includes a communication interface 56 that receives communications from the central controller 170, from adjacent segment controllers 50 in a path, the industrial controller 200, and/or the safety controller 250. The communication interface 56 extracts data from the message packets on the communication network and passes the data to a processor 52 executing in the segment controller 50. The processor may be a microprocessor. Optionally, the processor 52 and/or a memory device 54 within the segment controller 50 may be integrated on a field programmable array (FPGA) or an application specific integrated circuit (ASIC). It is contemplated that the processor 52 and memory device 54 may each be a single electronic device or formed from multiple devices. The memory device 54 may include volatile memory non-volatile memory, or a combination thereof. The segment controller 50 receives the motion profile or desired motion of the movers 100 and utilizes the motion commands to control movers 100 along the track segment 312 controlled by that segment controller 50.

Each segment controller 50 generates switching signals to generate a desired current and/or voltage at each coil 150 in the track segment 312 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150 and generates switching signals 72. Optionally, the processor 52 may incorporate the functions of the gate driver module 70 and directly generate the switching signals 72. The switching signals 72 are provided to the power conversion segment in each track segment 312, where each power conversion segment includes multiple power switching devices 74. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 322. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150.

The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 150. The energized coils 150 create an electromagnetic field that interacts with the drive magnets 140 on each mover 100 to control motion of the movers 100 along the track segment 12.

Figure 9:
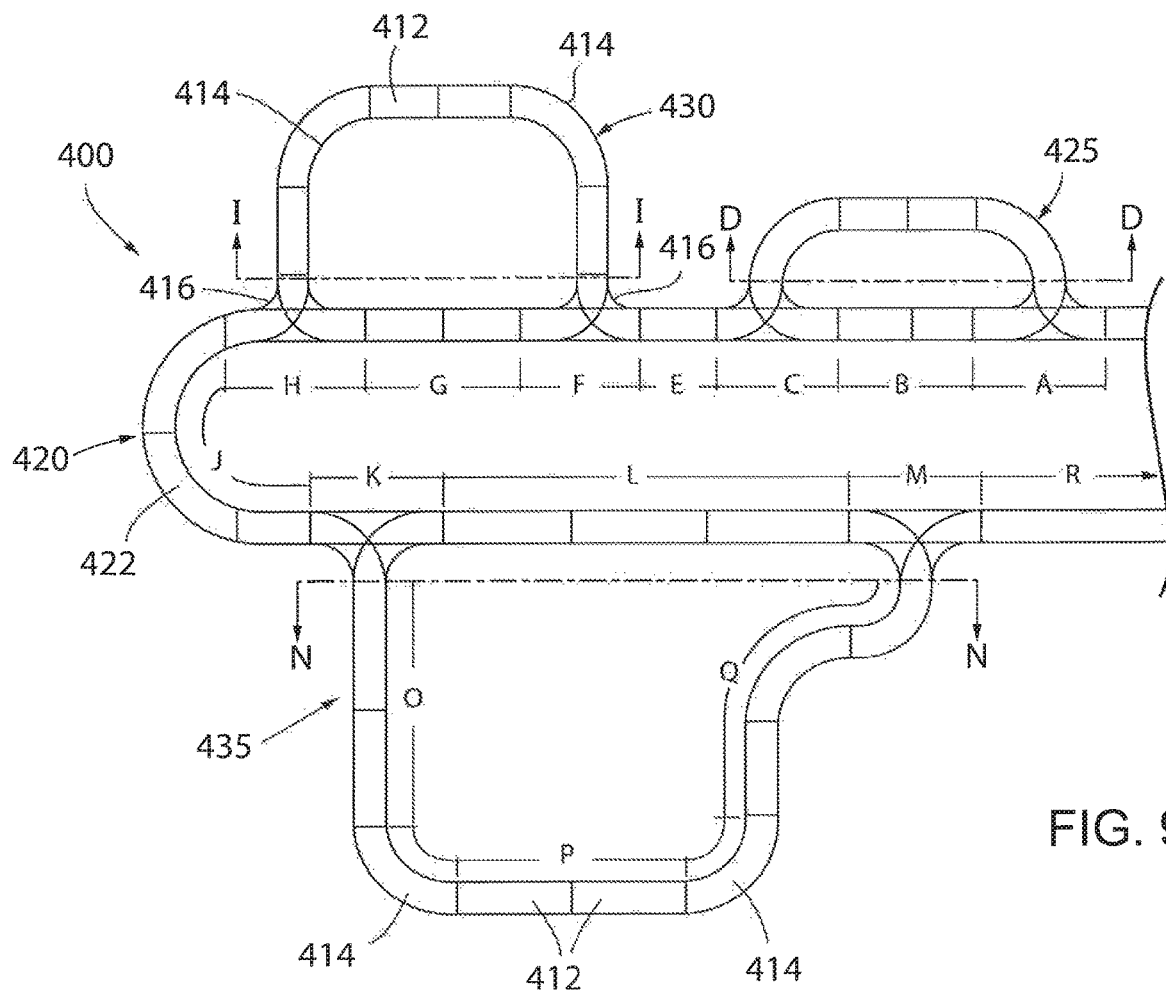
FIG. 9 is a top plan view of an exemplary track layout incorporating one embodiment of the present invention.

Turning next to FIG. 9, a portion of a more complicated track layout 400 than that shown in FIG. 1 is illustrated. The exemplary track layout 400 includes multiple straight track segments 412, multiple curved track segments 414, and multiple switch segments 416, where each switch segment 416 can selectively route a mover along one of multiple paths within the track layout 400. The track layout includes a central loop 420 where one end 422 of the central loop 420 is illustrated and the remainder of the loop extends beyond the right-hand side of the illustrated portion of the track layout 400 A first branch 425 and a second branch 430 are illustrated above the central loop 420. A third branch 435 is illustrated below the central loop 420, where the terms above and below are relational with respect to the illustration and do not indicate any particular physical orientation of the branches. The track layout 400 includes multiple sections distributed around the track. Each section is identified numerically by the letters "A" through "R" in the exemplary layout. Some sections include a single track segment 412, 414, or 416 while other sections include multiple track segments. The first branch 425 is illustrated as a single section, D, and the second branch 430 is similarly illustrated as a single section, I. However, a branch may include multiple sections as illustrated in the third branch 435, including sections O, P, and Q. Further, the central loop 420 is divided into different sections according to divisions created by each switch segment 416. However, it is contemplated that a section may span multiple switch segments or include both a portion of the central loop 420 and a branch (e.g., the first branch 425 or the second branch 430) extending parallel to the central loop. The illustration is not intended to be limiting and it is understood that various sections may include more or fewer track segments and numerous definitions of track sections may be defined without deviating from the scope of the invention.

In operation, the safety controller 250 executes safety programs to integrate safety in the independent cart system. As discussed above, the coils 150 spaced along the track act as a "stator" in a linear drive system, and the drive magnets 140 in each mover 100 act as a "rotor" in a linear drive system. Each mover 100 is independent controlled by generating an electromagnetic field in a coil 150 proximate the mover 100. The electromagnetic field from each coil 150 interacts with the magnetic field from each drive magnet 140 with either an attractive or a repelling force to "push" or "pull" the mover 100 along the track 10. Sequential activation of coils 150 results in a desired motion of each mover 100 along the track 10.

In traditional independent cart systems, a motion planner receives motion commands for a desired location of each mover 100. The motion planner may perform some initial processing on the motion commands and distributes the motion commands and/or current commands to the segment controllers 50 to achieve the desired operation of each mover 100. It is contemplated that the motion planner may execute in whole or in part on the central controller 170, the industrial controller 200, and external motion controller, the segment controllers 50 or a combination thereof. For convenience, the motion planner will be referred to generally herein with an understanding that operation of the motion planner may occur in whole or in part on the different controllers.

Traditionally, the motion planner requires each segment 12, 14 of a track 10 to be energized prior to beginning operation of the track. Because a mover 100 transitions between segments 12, 14 as it travels along the track 10, each segment needs to be powered up and ready to accept a mover 100 and to control operation of the mover when it transitions to the next segment. Because of the velocity at which each mover 100 travels and the number of movers 100 that can be present along a track 10, a central controller 170 or the industrial controller 200 cannot continually monitor the location and/or status of each mover 100 and track segment 12, 14 and selectively enable/disable the track segments 12, 14 as a mover 100 approaches the segment. Each segment 12, 14 needs to be energized and ready to accept a mover 100 when it transitions to the segment. However, the need for each segment to be powered up in an independent cart system prior to operation of the system runs counter to the desire to implement a safety function along a section of the track while allowing operation to continue along the remainder of the track.

Traditionally, safety systems have been implemented in a first manner by disabling power to a system, in a rotary motor, disabling power may be achieved by removing power to the stator of a motor. However, if power is removed from the "stator" in the linear drive system, all track segments will be disabled and there will be no motion available along the entire track, A second manner in which a safety system implements a safety function is to disable power to an axis of motion. However, in the linear drive system, each mover 100 is considered to be an axis of motion. If this second implementation of a safety function were desired within a particular section of the track, the axis corresponding to each mover 100 presently located within that section 12, 14 when the safety function is activated could be disabled. However, disabling each mover within a section does not totally prevent motion within the section. Additional movers 100, located outside the section 12, 14 when the safety function is implemented, would still be active and these movers 100 may subsequently be commanded to enter the section. Further, the power sections within each segment 12, 14 would remain energized, increasing the potential for inadvertent movement within the section if a mover 100 external to the section were to enter the section in which safe operation is desired.

The present invention allows for integration of safety functions within the independent cart system by disabling power to different track segments within a particular section of the track 10 in which a safety function is required. For purposes of illustration, FIG. 9 will be referenced with a safety function being desired within section P of the third branch 435 for the illustrated track layout 400. It is contemplated, that section P may be a location, for example, where maintenance is performed on the movers 100. After a certain amount of run time in the linear drive system, a mover 100 may require lubrication or replacement of a bearing. Similarly, a high current drawn by coils in order to drive a first mover 100 in comparison to other movers 100 of identical construction may indicate damage to the first mover 100. Whether routine or emergency maintenance is required, the motion planner may command the mover 100 to enter the third branch 435 and await maintenance. When a technician enters a region around section P in which to perform the required maintenance, an input signal is provided to the safety controller 250 and/or to the industrial controller 200 identifying the presence of the technician. The signal may be generated, for example, by a gate switch opening when the technician enters, a safety mat generating a signal when the technician steps on the mat, a light curtain identifying the technician as an obstruction within the protected region, or the like. The safety controller 250 executes a safety program in response to receiving the input signal, where the safety program is operative to generate a output signal for a segment controller 50 to remove power from section P in response to receiving the input signal.

The safety controller 250 and the segment controllers 50 are configured according to a required safety level to ensure with a certain probability that the power is removed and remains removed from the power section of each track segment within the safety section, i.e., section P, while the input signal indicates the presence of the technician. The required level of safety is defined by the application requirements and may be implemented according to a standard, such as, a desired Safety Integrity Level (SIL) as defined by the International Electrotechnical Commission (IEC) standard IEC 61508. The safety controller 250 may include, for example, redundant input signals, each receiving the input signal identifying the presence of the technician, redundant processors executing the safety program, redundant output signals to transmit the requested safety function to the segment controller, or a combination thereof.

According to one embodiment of the invention, the output signal from the safety controller 250 is transmitted to each segment controller 50 within a section for which the safety function is to be implemented. According to the illustrated embodiment, section P includes two curved segments 414 and two straight segments 412. The output signal from the safety controller 250 is provided to each segment controller 50. The output signal may be transmitted in a data packet across the industrial network 160 from the safety controller 250 directly to each segment controller 50, via the central controller 170, or via other network devices, such as wired or wireless routers and the like according to the network layout. When the segment controller 50 receives the output signal from the safety controller 250 it disables the current flow to the coils 150 in the track segment it is controlling.

It is further contemplated that each segment controller 50 may be configured to disable the current flow to the coils 150 along the corresponding segment according to different stopping routines. In one embodiment of the invention, each segment controller 50 may include a configuration parameter stored in the memory 54 of the segment controller 50 defining how the segment controller 50 is to execute in response to a safety signal from the safety controller 250. In another embodiment of the invention, the safety controller 250 may be configured to generate multiple output signals where each output signal instructs a segment controller 50 to execute a different stopping function according to the particular output signal received.

It is contemplated that multiple different stopping functions may be implemented by the safety controller 250 and segment controller 50. In a first stopping function, the current is removed immediately from the coils 150 and will remain off until the safety signal indicates it is safe to restore power to the coils 150. In a second stopping function, the segment controller 50 first regulates the current output to the coils 150 to bring any movers 100 present on the segment to a stop. Once each of the movers 100 comes to a stop, current is removed from the coils 150. According to a third stopping function, the segment controller 50 first regulates the current output to the coils 150 to bring any movers 100 present on the segment to a stop. Once each of the movers 100 comes to a stop, the segment controller 50 continues to regulate current flow to the coils 150 such that each of the movers remains in its current position. According to another aspect of the invention, it is contemplated that each stopping function may incorporate a delay timer before execution of the safety function. In other words, either the safety controller 250 or the segment controller 50 executes a timer function in response to determining that the safety function is required. The timer function allows operation of the system to continue for the duration of the timer before removing power from the coils 150 or bringing the movers 100 present on the track segment 12, 14 to a controlled stop.

In addition to sending the safety signal to the segment controller 50, the safety controller 250 outputs the safety signal to the central controller 170 and/or the industrial controller 200. As previously discussed, prior control of independent cart systems required that each segment 412, 414 be enabled and ready to supply current to the coils 150 as a mover 100 transitions to that track segment in order for the entire system to operate. This check for each segment to be operational is typically performed by one, or both, of the central controller 170 or the industrial controller 200. By providing the safety signal to the controller responsible for verifying that each segment is active, the controller may allow other segments to remain active even if the segments 412, 414 located within the disabled section (e.g., section P) are not presently enabled and are not ready to accept additional movers 100 onto the segment.

According to another aspect of the invention, it is contemplated that the safety controller 250 may output additional signals to one or more sections adjacent to the section receiving the safety signal for the stopping function. The sections adjacent to the section receiving the safety signal for the stopping function may receive a separate signal corresponding to a monitoring function or may receive the same signal and be configured to execute a monitoring function rather than a stopping function.

The monitoring functions in adjacent sections can work in cooperation with a stopping function to provide additional safety within the section in which the stopping function is implemented. A monitoring function may, for example, limit a rate of acceleration or speed of travel for a mover 100 within a section. Similarly, the monitoring function may impose a position limit restricting a range of travel within the section. The monitoring function, therefore, can be used to slow or stop a mover 100 while it is in a section adjacent to a stopped section. Alternately, the monitoring function can prevent a mover 100 from traveling beyond the end of the section adjacent to the stopped section. As a result, once a stopping function has brought all motion within a protected section to a stop, the monitoring functions prevent any further movers 100 from entering the restricted section. Referring again to FIG. 9, section O and section Q can be configured to execute monitoring functions. Sections O and Q may receive the same safety signal sent to section P and be configured to execute the monitoring functions or receive a separate signal from the safety controller 250 instructing each segment controller within the respective sections to implement a monitoring function.

According to the example previously introduced, once a technician is servicing movers 100 present along section P in the third branch 435, activity may continue on the remainder of the system shown in the track layout 400. When a technician completes service on a mover 100, he may manually position it to the section Q, where section Q may be configured to allow motion in one direction only, such that repaired movers 100 are able to leave the third branch and return to service along the central loop 420. Further, if additional movers 100 detect that maintenance is required, section O may be configured to limit speed and travel of movers 100 entering the section such that a mover 100 cannot travel beyond the end of section O. Thus, a mover 100 detecting that it requires maintenance may still put itself out of service along the third branch 435 but not enter the safety section (section P) while the technician is still present.

It is further contemplated that a safety function may require only that a monitoring function rather than a stopping function be executed within a particular section. For example, in certain applications, a quality control inspector may periodically inspect product. It may be desirable to limit speed of travel of the movers within a section while the quality control inspector is present in order to observe product located on each mover 100 but allow a higher rate of travel when the inspector is not present. The safety controller 250 may output a signal to the segment controller 50 requesting the limited speed and the segment controller 50 regulates the current output to the coils 150 accordingly to prevent the movers 100 from traveling above the desired safe speed while the inspector is present next to the section.

According to still another embodiment of the invention, the safety controller 250 may be configured to control a relay that is part of each segment controller 50. The relay may provide an input to the segment controller and work in a manner substantially as described above with a data message. Alternately, the relay may be a contactor configured to remove power from the power section of each segment 12, 14. Thus, the relay may be used to disable power flow to the coils 150 along the corresponding segment.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An independent cart system, comprising:
   a track having a plurality of track segments, wherein each track segment includes;
      a plurality of coils spaced along the track segment, and
      a segment controller operative to regulate a current flow in the plurality of coils;
   a plurality of movers, wherein each mover includes a set of drive magnets and each mover is configured to travel along the track responsive to an interaction between the set of drive magnets on the mover and an electromagnetic field generated by the current flow in the plurality of coils; and
   a safety controller in communication with the segment controller in at least one of the plurality of track segments, the safety controller including at least one input configured to receive a safety configured to indicate the presence of a technician, wherein the safety controller is operative to:
receive the safety signal at the at least one input,
execute a safety program responsive to receiving the safety signal to achieve a desired safety level, and
transmit an output signal to the segment controller with which the safety controller is in communication responsive to executing the safety program, wherein the segment controller is operative to perform a safety function responsive to receiving the output signal from the safety controller.

2. The independent cart system of claim 1, Wherein:
the track includes a plurality of sections defined along a length of the track,
each of the plurality of sections includes at least one track segment, and
the safety controller transmits the output signal to each segment controller within one of the plurality of sections responsive to receiving the safety signal.

3. The independent cart. system of claim 2, wherein:
the safety controller receives a plurality of safety signals,
each of the plurality of safety signals corresponds to one of the plurality of sections,
the safety controller transmits a plurality of output signals,
each of the plurality of output signals is generated responsive to one of the plurality of safety signals, and
each of the plurality of output signals is transmitted to the section corresponding to the safety signal responsive to which it was generated.

4. The independent cart system of claim 2, wherein the safety controller is further operative to:
receive a first safety signal and a second safety signal,
execute a first safety program responsive to the first safety signal,
execute a second safety program responsive to the second safety signal,
transmit a first output signal to the segment controller wherein the segment controller is operative to achieve a first safety function responsive to receiving the first output signal from the safety controller, and
transmit a second output signal to the segment controller wherein the segment controller is operative to achieve a second safety function responsive to receiving the second output signal from the safety controller.

5. The independent cart system of claim 2. wherein:
the output signal is a first output signal,
the section receiving the first output signal is a first section, and
the safety controller is further operative to transmit at least one second output signal to each segment controller located in a second section, the second section being located adjacent to the first section.

6. The independent cart system of claim 5 wherein each segment controller in the second section is configured to execute a monitoring safety function responsive to receiving the second output signal from the safety controller.

7. The independent cart system of claim 1 wherein the segment controller receiving the output signal is operative to disable the current flow in the plurality of coils of the corresponding track segment.

8. A method for implementing a safety function in an independent cart system, wherein the independent cart system includes a track having a plurality of track segments and a plurality of movers configured to travel along the track, the method comprising the steps of:
regulating a current in a plurality of coils present along each track segment, selected from the plurality of track segments, with a segment controller corresponding to each track segment, wherein the current is regulated to control operation of each of the plurality movers present on the corresponding track segment;
receiving at a safety controller an input signal configured to indicate the presence of a technician. Wherein:
the input signal configured for operation at a desired safety level is required in at least one section of the track,
the track includes a plurality of sections defined along the track, and
at least one track segment is present in each of the plurality of sections;
executing a safety program in the safety controller responsive to receiving the input signal, wherein the safety program achieves the desired safety level;
transmitting an output signal from the safety controller to each segment controller corresponding to each track segment within the at least one section of the track in which safe operation is desired; and
executing a safety function with the segment controller in each track segment within the at least one section of the track in which safe operation is desired responsive to receiving the output signal at the corresponding segment controller.

9. The method of claim 8 further comprising the steps of:
receiving a plurality of input signals at the safety controller, wherein at least one of the plurality of input signals corresponds to each of the plurality of sections, and
transmitting a plurality of output signals from the safety controller, wherein each of the plurality of output signals is generated responsive to one of the plurality of input signals and wherein each of the plurality of output signals is transmitted to the section corresponding to the input signal responsive to which it was generated.

10. The method of claim 8 wherein the input signal is a first input signal, the safety program is a first safety program, and the output signal is a first output signal, the method further comprising the steps of:
receiving a second input signal at the safety controller, wherein the second input signal indicates safe operation is desired in at least one additional section of the track,
executing a second safety program in the safety controller responsive to receiving the second input signal;
transmitting a second output signal from the safety controller to each segment controller corresponding to each track segment within the at least one additional section of the track; and
executing a second safety function with the segment controller in each track segment within the at least one additional section of the track responsive to receiving the second output signal at the corresponding segment controller.

11. The method of claim 8 wherein the output signal is a first output signal, the section receiving the first output signal is a first section, and the method further comprises the step of transmitting at least one second output signal from the safety controller to each segment controller located in a second section, the second section being located adjacent to the first section.

12. The method of claim 11 further comprising the step of executing a monitoring safety function in each segment controller in the second section responsive to receiving the second output signal from the safety controller.

13. The method of claim 8 wherein executing the safety function includes disabling the current in each of the plurality of coils present along each track segment.

14. An independent cart system having a track with a plurality of segments and a plurality of movers configured to travel along the track, the independent cart system comprising:
- a plurality of segment controllers, wherein each segment controller corresponds to one of the plurality of segments and is operative to regulate a current output to a plurality of coils spaced along the segment responsive to a motion command for at least one of the plurality of movers located on the segment; and
- a safety controller in communication with each of the plurality of segment controllers, the safety controller including at least one input configured to receive a safety signal configured to indicate the presence of a technician, wherein the safety controller is operative to:
  receive the safety signal at the at least one input,
  execute a safety program responsive to receiving the safety signal to achieve a desired safety level, and
  transmit an output signal to at least one of the plurality of segment controllers with which the safety controller is in communication responsive to executing the safety program, wherein the segment controller is operative to perform a. safety function responsive to receiving the output signal from the safety controller.

15. The independent cart system of claim 14, wherein:
the track includes a plurality of sections defined along a length of the track,
each of the plurality of sections includes at least one of the plurality of segments, and
the safety controller transmits the output signal to each segment controller within one of the plurality of sections responsive to receiving the safety signal.

16. The independent cart system of claim 15, wherein:
the safety controller receives a plurality of safety signals,
each of the plurality of safety signals corresponds to one of the plurality of sections,
the safety controller transmits a plurality of output signals,
each of the plurality of output signals is generated responsive to one of the plurality of safety signals, and
each of the plurality of output signals is transmitted to the section corresponding to the safety signal responsive to which it was generated.

17. The independent cart system of claim 15, wherein the safety controller is further operative to:
receive a first safety signal and a. second safety signal,
execute a first safety program responsive to the first safety signal,
execute a second safety program responsive to the second safety signal,
transmit a first output signal to the segment controller wherein the segment controller is operative to achieve a first safety function responsive to receiving the first output signal from the safety controller, and
transmit a second output signal to the segment controller wherein the segment controller is operative to achieve a second safety function responsive to receiving the second output signal from the safety controller.

18. The independent cart system of claim 15 wherein:
the output signal is a first output signal,
the section receiving the first output signal is a first section, and
the safety controller is further operative to transmit at least one second output signal to each segment controller located in a second section, the second section being located adjacent to the first section.

19. The independent cart system of claim 18 wherein each segment controller in the second section is configured to execute a monitoring safety function responsive to receiving the second output signal from the safety controller.

20. The independent cart system of claim 14 wherein the segment controller receiving the output signal is operative to disable the current output to the plurality of coils of the corresponding track segment.

* * * * *